United States Patent
Chevallier-Mames et al.

(10) Patent No.: US 8,886,940 B2
(45) Date of Patent: Nov. 11, 2014

(54) HASH FUNCTION USING A CARD SHUFFLING PROCESS

(75) Inventors: Benoit Chevallier-Mames, Paris (FR); Mathieu Ciet, Paris (FR); Augustin J. Farrugia, Cupertino, CA (US)

(73) Assignee: Apple Inc., Cupertino, CA (US)

(*) Notice: Subject to any disclaimer, the term of this patent is extended or adjusted under 35 U.S.C. 154(b) by 1379 days.

(21) Appl. No.: 12/475,384

(22) Filed: May 29, 2009

(65) Prior Publication Data

US 2010/0306541 A1    Dec. 2, 2010

(51) Int. Cl.
 G06F 21/00    (2013.01)
 H04L 9/06    (2006.01)
 H04L 9/32    (2006.01)
 A63F 1/12    (2006.01)

(52) U.S. Cl.
 CPC .......... H04L 9/3236 (2013.01); *A63F 1/12* (2013.01); H04L 9/0662 (2013.01)
 USPC .............. 713/170; 713/176; 380/36; 380/37; 380/46

(58) Field of Classification Search
 CPC ................ H04L 9/0662; H04L 9/3236
 USPC .......................... 713/170, 176; 380/36, 37, 46
 See application file for complete search history.

(56) References Cited

U.S. PATENT DOCUMENTS

| 2003/0039357 A1* | 2/2003 | Alten .................... 380/46 |
| 2006/0248273 A1* | 11/2006 | Jernigan et al. ............ 711/114 |
| 2010/0211787 A1* | 8/2010 | Bukshpun et al. .......... 713/170 |

OTHER PUBLICATIONS

Menezes, A.J.,. et al., Handbook of Applied Cryptography. New York, CRC Press. Oct. 1996 p. 321, 322 and 425.*

* cited by examiner

*Primary Examiner* — Justin T Darrow
(74) *Attorney, Agent, or Firm* — Adeli LLP

(57) ABSTRACT

In the computer data security field, a cryptographic hash function process embodied in a computer system and which is typically keyless, but is highly secure. The process is based on the type of chaos introduction exhibited by a game process such as the well known shuffling of a deck of playing cards. Computation of the hash value (digest) is the result of executing in a model (such as computer code or logic circuitry) a game algorithm that models the actual game such as a playing card shuffling algorithm using the message as an input to the algorithm, then executing the card shuffling algorithm on the input. A state (order) of the modeled deck of cards after a shuffle (or multiple shuffles) gives the hash digest value.

40 Claims, 3 Drawing Sheets

| RNG_BUFFER_SIZE | integer | size of the RNG buffer |
|---|---|---|
| RngBuffer | word array | RNG buffer |
| CARD_PACKET_SIZE | integer | number of cards in the deck |
| CardPacket | word array | Buffer of all the cards |
| NB_SHUFFLING_STRATEGY | integer | number of ways to shuffle the packet of cards |
| KSEC_PARAMETER | integer | number of shuffles |
| ShufflingStrategy | integer | number of types of shuffles |

Fig. 1

HASH FUNCTION USING A CARD SHUFFLING PROCESS

FIELD OF THE INVENTION

This invention relates to computers, computer data security, and hash functions (hashing).

BACKGROUND

Hash functions are well known in the field of data security. The principle is to take data (a digital message, digital signature, etc.) and use it as an entry to a hash function resulting in an output called a "digest" of predetermined length which is intended to uniquely identify ("fingerprint") the message. A secure (cryptographic) hash is such that any alteration in the message results in a different digest, even though the digest is much shorter than the message. Such hash functions are "collision-resistant" and "one-way."

Cryptography and data security deal with digital signatures, encryption, document authentication, and hashing. In all of these fields, there is a set of basic tools/functions which are widely used, for instance hash functions. Several properties are required for the use of hash functions in cryptographic applications: preimage resistance, second preimage resistance and collision resistance.

In the recent years, much energy has been expended finding new hash functions, since collisions (weaknesses or successful attacks) have been found in the widely used SHA-1 standard hash.

SUMMARY

Disclosed here is a new type of cryptographic (secure) hash function or process. The goal is a highly modular hash function that is also computationally efficient (fast). The present hash function can conventionally be used for document integrity for exchanges and signatures. It can be also used as a derivation function or as a HMAC (hash message access code) by adding a key conventionally (as in for instance the well known HMAC-SHA1) and the term "hash" as used herein is intended to encompass all these uses, both keyed and non-keyed.

A hash function is a deterministic procedure that accepts an arbitrary input value, and returns a hash value. The input value is called the message, and the resulting output hash value is called the digest. The message is authenticated by comparing the computed digest to an expected digest associated with the message.

The present hash process is based on the concept of physical playing card shuffling as used to randomize a deck of playing cards. Playing cards are usually provided in a deck of e.g. 52 cards, each card being unique in terms of suit and number or picture. In actual card games, each deck (or sometimes multiple decks) is often shuffled prior to the game to ensure some degree of randomness when the cards are dealt to the card players. There are many known techniques to shuffle (reorder) a deck of cards, as explained below. Shuffling in this context is inherently a way to increase the degree of randomness in the order of the cards.

No actual (physical) cards are shuffled or used or even displayed in accordance with the invention. Instead a "notional" card shuffle (in terms of changing the order of notional cards in a notional deck of cards) is modeled mathematically, without a player or dealer. In the present hash function, there is no introduction of randomness from a player or dealer since the way the cards (which are notional) change order is uniquely determined by the input (message) in one embodiment. This means the hash function disclosed here is completely deterministic. The notional card shuffle is a mathematical model of any one of the conventional physical card shuffles or variants thereof. It need not conform to any such actual shuffle.

The present approach is based on the observation that card shuffling intentionally exhibits a high degree of randomness in the way the cards in the deck are reordered. The present goal is to use the principle of such a shuffle to compute a hash function since such a chaotic (randomness) characteristic provides a secure hash function. In this sense secure means strongly one way, meaning that given a message it is easy to compute the digest, but it is very difficult to find a message that returns a given digest.

Since such actual card shuffles are well known and exist in many variants, programming details of the card movement (which models the shuffle as a process) are not given here as being well known and expressions of well defined reordering processes as explained below. This provides the mathematical model used in accordance with the invention to model card shuffles. Writing the portions of the code that embody the physics of the ball movement is relatively simple given these models. Many variations of card shuffles are known and their principles may be used in accordance with the invention, given however that here no person is playing a physical game but there is execution of the core algorithm (rules and logic) of such a shuffle to generate the hash digest. Moreover the present hash function is computed very rapidly in computer software (or hardware—dedicated circuitry). For instance, a "checksum" function is used when transferring data requires fast determination of the digest. This hash function is especially useful for a checksum function when transferring large amounts of data.

A number of techniques are known to shuffle a physical deck of cards. One is the riffle or dovetail shuffle, where half the deck is held in each hand with the thumbs inward, then the cards are released by the thumbs so that they fall to the table interleaved. Some people lift the cards up after a riffle, forming a bridge which puts the cards back into place. This can also be done by placing the halves flat on the table with their rear corners touching, then lifting the back edges with the thumbs while pushing the halves together.

Another shuffle is called the stripping shuffle, where small groups of cards are removed from the top or bottom of a deck and replaced on the opposite side of the deck (or assembled on the table in reverse order).

In the Hindu shuffle the deck is held face down, with the middle finger on one long edge and the thumb on the other on the bottom half of the deck. The other hand draws off a packet from the bottom of the deck. This packet is allowed to drop into the palm, then put on top of the first half. The maneuver is repeated until the deck is all in the second hand.

In a pile shuffle, cards are dealt into a number of piles, then the piles are stacked on top of each other. This ensures that cards that were next to each other are now separated. This shuffle does not provide good randomization.

The Corgi, Chemmy or Wash shuffle involves spreading the cards out face down, and sliding them around and over each other with one's hands. Then the cards are moved into one pile so that they begin to intertwine and are then arranged back into a deck.

The Mongean shuffle is performed as follows. Start with the unshuffled deck in the left hand and transfer the top card to the right. Then repeatedly take the top card from the left hand and transfer it to the right, putting the second card at the top of the new deck, the third at the bottom, the fourth at the top, the fifth at the bottom, etc.

Weaving is the procedure of pushing the ends of two halves of a deck against each other so they intertwine.

The faro shuffle is performed by cutting the deck into two, preferably equal, packs in both hands as follows. The cards are held from above in the right and from below in the left hand. Separation of the deck is done by lifting up half the cards with the right hand thumb and pushing the left hand's packet forward away from the right hand. The two packets are often crossed and slammed into each other to align them. They are then pushed together by the short sides and bent (up or down). The cards then alternately fall into each other. The faro shuffle does not randomize a deck.

In the computer software environment, such physical shuffling conventionally is equivalent to generating a random permutation (reordering) of the cards. There are two basic computer software algorithms for doing this. The first is simply to assign a random number to each card, and then to sort the cards in order of their random numbers. This generates a random permutation, unless two of the random numbers generated are the same. This can be eliminated either by retrying these cases, or reduced to a low probability by choosing a sufficiently wide range of random number choices.

The second is a linear-time algorithm which involves moving through the pack from top to bottom, swapping each card in turn with another card from a random position in the part of the pack that has not yet been passed through (including itself). Providing the random numbers are unbiased, this will always generate a random permutation. Of course such true randomness is not suitable for use in the present hash function.

Note that terms such as "card," "deck," "shuffle," "shuffling" and "order" as used here in connection with the present invention do not refer to any physical object or act or any actual depiction of same even on a computer or game display, but instead to values, identifiers, or variables used in computer code or logic to compute a hash function or equivalent, and are used only for convenience of understanding herein as referring conceptually to analogous aspects of the above described physical card shuffling.

Further, the present method and apparatus are an example of using a model of a physical game or equivalent process (all referred to here as games), where the physical game has an element of randomness (chaos introduction), to derive a hash function. Derive in this context refers to modifying the game concept to achieve the security needed by hash functions, such as to be collision free. Many games include an aspect of chaos introduction (usually but not necessarily combined with player skill). This chaos introduction means that the outcome is highly modified by even a slightly modified input. Moreover, given the result (outcome) it is hard to find the original state (input.)

The concept of games here includes physical games where no player skill is needed at all such as certain gambling games and portions of such games. All such games in accordance with the invention are embodied in a model (notional game) which however is not truly random but is deterministic in the sense of the notional game being pseudo random where the result (hash digest) is wholly dependent on the input (the message). The notional game may include in its model physical aspects of the game such as movement of a ball modeled by Newtonian physics. The notional game model (algorithm) serves as the core of the hash function as described above. Further, as in accordance with the above described card shuffling approach (where here the shuffling itself is the physical game), the model of the game may be simplified in some ways compared to the actual game (e.g. there is no concern with the suits/values of the notional cards) but more complex in other ways (e.g. there is an aspect of additional pseudo randomness in using various different notional shuffling techniques in combination.).

These approaches include receiving the message (in the form of data) as an input (which may be conventionally padded if needed so as to be integer of blocks in length), storing the message in the form of a table (data structure) having a number of entries of specified length, and applying the game model (algorithm) to the table entries to alter the entries in some predetermined way. In some versions (as described above) the message is first used to seed a pseudo random number generator to define the initial state of the system (the table), but this is not the case in all embodiments where instead the message may be entered into the table directly. The hash digest is then the state of the table (or part of the table) after application of the game algorithm. The game algorithm may include multiple iterations of the notional game as determined by a security parameter.

BRIEF DESCRIPTION OF THE FIGURES

FIG. 1 shows a set of variables and parameters.

DETAILED DESCRIPTION

Figure 2:
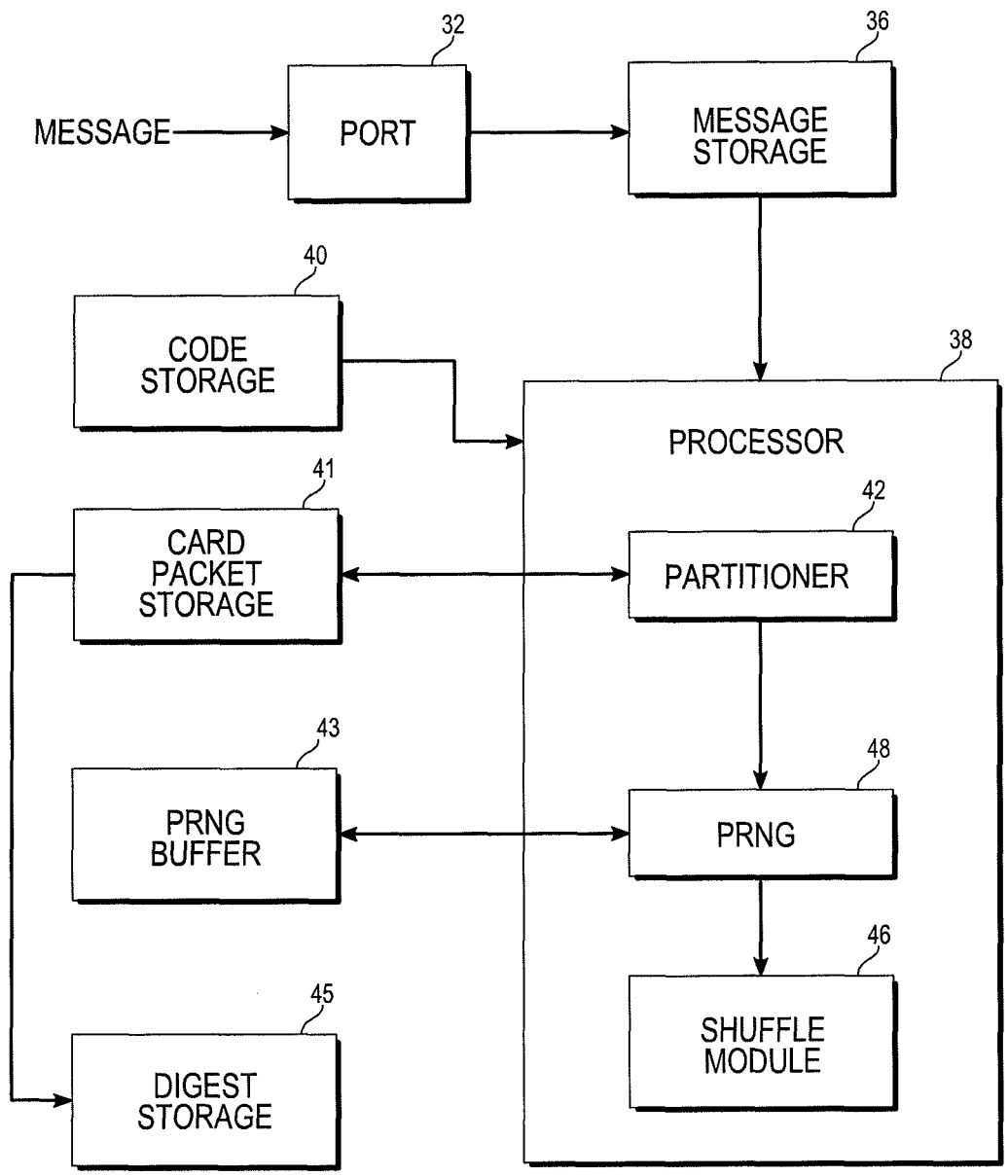
FIG. 2 shows relevant portions of a computing device for carrying out the present method.

The present method and apparatus use in one embodiment certain principles of card shuffling as referred to above to calculate a hash value in the computer environment. There are numerous known ways to shuffle playing cards, from simple to complex some of which are explained above. These different techniques are used here for a computationally simple and very efficient (in term of performance) hash function. Note that there is no particular concern here for the suit/value of the cards—only their order in the deck is of interest here.

The present method is as follows: first, one defines a notional deck of cards designated CardPacket, the value of each entry of which being an integer and which depends on entries of the hash function (the input message). CardPacket is thereby a table (data structure or array or state) held in computer memory. The number of notional cards in the notional deck is theoretically unlimited (in the actual game this is usually 52 per deck), but an exemplary value (for the present hash function) is CARD_PACKET_SIZE=128 cards. In other words, the table CardPacket has 128 entries in this example.

Each notional card (entry) in CardPacket is represented as a data word; one may use 32-bit long words, but a simpler implementation uses other size words, such as 16-bit or one bytes or other convenient length. After the notional deck of cards (CardPacket) is initialized by the message, through a function designated InitDeck shown below, one can introduce as many variants of card shuffling as described above as desired.

In addition to the known card shuffling techniques as explained above, one can easily develop other shuffling methods and the invention is not limited to any particular shuffles.

Such actual (physical) card shuffling methods are generally intended to be random as mentioned above. In the present system, this shuffling is instead done with pseudo-random values based on a conventional pseudo random number generator or function (PRNG) seeded with the input message.

The operation is thereby deterministic (one output for one input) and not truly random and depends only on the input for the output (result).

The present notional shuffling is used to scramble the order of the notional cards, whose values are set at the beginning of calculating the hash function and expressed as the table CardPacket. One may select the type of notional shuffling depending on the value output by the PRNG which is initiated (seeded) with the input message. The PRNG is based, for example, conventionally on a buffer (memory) designated RngBuffer, whose size (length) is an integer designated RNG_BUFFER_SIZE. The present PRNG can conventionally employ various cryptographic algorithms such as AES, DES (with fewer rounds), stream ciphers, etc in its operation.

The PRNG function is able to accept any size input (seed). Thus one is able to hash an input message of any size. In one embodiment, conventionally the input message is padded so as to have a set (integer number) of fixed sized blocks as the message to be hashed.

A requirement in one embodiment from a security point of view of this hash function is that its collision resistance is less than $2^m$, where typically m=half the size of the hash digest size. In one embodiment there is also a security parameter k which is an integer designated kSEC_PARAMETER whose typical value is 128. For a loop of kSEC_PARAMETER iterations, the hash algorithm selects at each index of the loop, in a deterministic way, e.g., with a call to the PRNG, a notional card shuffling method which is one of several predetermined methods as described above and whose integer number is designated NB_SHUFFLING_STRATEGY, and notionally shuffles the notional cards using the selected notional card shuffling method. This selection of methods is carried out with the use of the PRNG described above.

Note that this hash function can be keyed to construct a HMAC in a conventional way.

The present hash function (which computes the message digest) in one embodiment is expressed as pseudo code which is conventionally structurally similar to actual code (computer software) but is somewhat less detailed and not executable and is as follows, where in this example NB_SHUFFLING_STRATEGY=5:

```
/* Initiate the RNG with the input message */
InitRNG(RngBuffer, RNG_BUFFER_SIZE, inputMessage,
    inputMessageLength);
/* Init the packet */
InitDeck(CardPacket, CARD_PACKET_SIZE, RngBuffer,
    RNG_BUFFER_SIZE);
/* Shuffle the cards */
for (j = 0; j < kSEC_PARAMETER; j++) {
   unsigned char ShufflingStrategy = GetRNG(RngBuffer,
   RNG_BUFFER_SIZE)
                     % NB_SHUFFLING_STRATEGY;
   if (ShufflingStrategy = = 0) {
       ShufflingMethodOne(CardPacket, CARD_PACKET_SIZE,
                RngBuffer, RNG_BUFFER_SIZE);
       j++;
   }
   else if (ShufflingStrategy = = 1) {
       ShufflingMethodTwo(CardPacket, CARD_PACKET_SIZE,
                RngBuffer, RNG_BUFFER_SIZE);
       j++;
   }
   else if (ShufflingStrategy = = 2) {
       ShufflingMethodThree(CardPacket, CARD_PACKET_SIZE,
                RngBuffer, RNG_BUFFER_SIZE);
       j++;
   }
   else if (ShufflingStrategy = = 3) {
       ShufflingMethodFour(CardPacket, CARD_PACKET_SIZE,
                RngBuffer, RNG_BUFFER_SIZE);
   }
   else if (ShufflingStrategy = = 4) {
       ShufflingMethodFive(CardPacket, CARD_PACKET_SIZE,
                RngBuffer, RNG_BUFFER_SIZE);
   }
}
```

Functions ShufflingMethodOne to ShufflingMethodFive are each one of several predetermined functions that each notionally shuffle the notional deck with a different shuffling method as explained above with reference to physical card shuffling. (Here the use of five shuffling techniques is only exemplary.) Modeling these actual card shuffling techniques is well known as described above. These functions also each call (invoke) the PRNG function. Hence their individual shuffling techniques use pseudo-randomness (e.g. for the size of subdecks, or for locations of the cards to exchange). The PRNG function is itself conventional as explained above.

The operators in this pseudo code are conventional for the C computer language, where "++" denotes increment by one; "/*" denotes a comment; and "%" denotes modulus.

At the end of execution of this algorithm, the data structure (table) CardPacket, which contains the data representing the cards, is mixed, in order to get the hash value of the expected length. This mixing can be done in several ways, for instance, use of linear feedback shift registers (LFSR) or non-linear feedback shift registers (NLFSR.) Note that this pseudo code does not include the following conventional steps for using the hash digest which include extracting the digest from the table and comparing the digest to a digest associated with the message and typically supplied from an external source so as to authenticate the message. Such steps are conventional with use of hash functions.

In another embodiment (which is more complex), one decomposes the input message into bytes, words, or portions of any size. To improve the randomness (in a cryptographic sense), one changes the size (length) of the cards (entries) in CardPacket for each iteration. For instance in one embodiment, the card size is 32-bits for the first index referring to the message blocks (iteration) of a loop, 4-bits for the second index, 16-bits for the third index, 1-bit for the fourth index, etc.

FIG. 1 shows variables and parameters for the above pseudo code (first column) with their type (second column) and explanatory comments (third column).

FIG. 2 shows in a block diagram relevant portions of a computing device (system) 30 in accordance with the invention. This is, e.g., a server platform, computer, mobile telephone, Smart Phone, personal digital assistant or similar device, or part of such a device and includes conventional hardware components executing in one embodiment software (computer code) as represented by the above pseudo-code example. This code may be, e.g., in the C or C++ computer language or its functionality may be expressed in the form of firmware or hardware logic; writing such code or designing such logic would be routine in light of the above pseudo code. Of course, the above pseudo code example is not limiting.

The computer code is conventionally stored in code memory (computer readable storage medium) 40 (as object code or source code) associated with conventional processor 38 for execution by processor 38. The incoming message (in digital form) is received at port 32 and stored in computer readable storage medium (memory) 36 where it is coupled to processor 38. Processor 38 conventionally partitions the message into suitable sized blocks at partitioning module 42. Other software (code) modules in processor 38 are the card shuffling algorithm module 46 which carries out the pseudo code functionality set forth above and the PRNG function 48 with its associated buffer RngBuffer (memory) 43.

Also coupled to processor 38 are the CardPacket computer readable storage medium (memory) 41 (which stores the notional deck of cards), as well as a third storage 45 for the resulting extracted hash digest. The hash digest is conventionally extracted from CardPacket, for instance as n consecutive CardPacket entries. Storage locations 36, 40, 41, 43, 45 may be in one or several conventional physical memory devices (such as semiconductor RAM or its variants or a hard disk drive).

Electric signals conventionally are carried between the various elements of FIG. 2. Not shown in FIG. 2 is the subsequent conventional use of the resulting hash digest stored in storage 45, which is compared by processor 38 to a second expected hash digest value associated with the incoming message. Only if the two hash digest values match is the message (a digital document, digital signature or similar information) authenticated.

Figure 3:
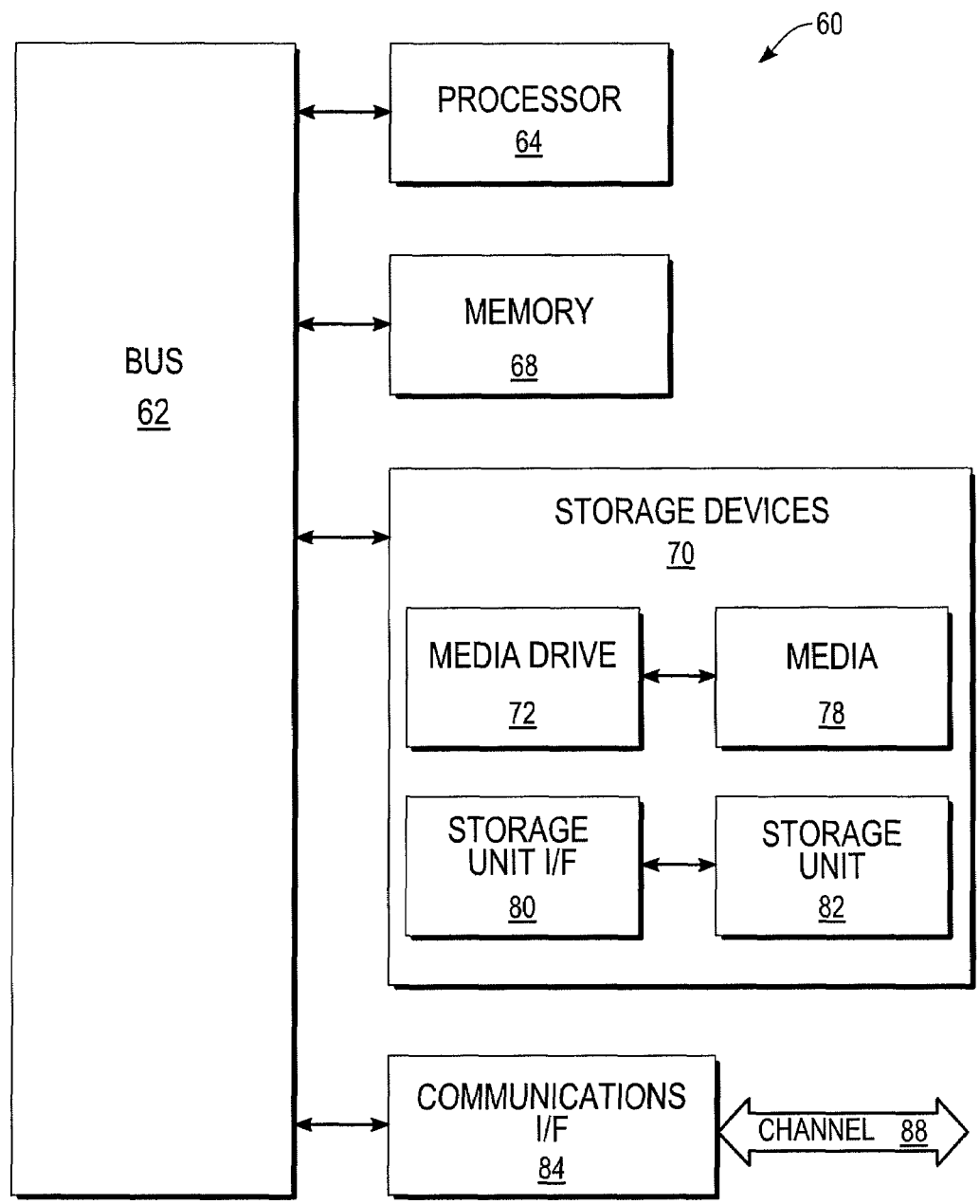
FIG. 3 shows additional detail of the FIG. 2 computing device.

FIG. 3 shows further detail of the FIG. 2 computing device in one embodiment. FIG. 3 illustrates a typical and conventional computing system 60 that may be employed to implement processing functionality in embodiments of the invention and shows additional detail of the FIG. 2 system. Computing systems of this type may be used in a computer server or user (client) computer or other computing device, for example. Those skilled in the relevant art will also recognize how to implement embodiments of the invention using other computer systems or architectures. Computing system 60 may represent, for example, a desktop, laptop or notebook computer, hand-held computing device (personal digital assistant (PDA), cell phone, palmtop, etc.), mainframe, server, client, or any other type of special or general purpose computing device as may be desirable or appropriate for a given application or environment. Computing system 60 can include one or more processors, such as a processor 64 (equivalent to processor 38 in FIG. 2). Processor 64 can be implemented using a general or special purpose processing engine such as, for example, a microprocessor, microcontroller or other control logic. In this example, processor 64 is connected to a bus 62 or other communications medium. Note that in some embodiments the present process is carried out in whole or in part by "hardware" (dedicated circuitry) which is equivalent to the above described software embodiments.

Computing system 60 can also include a main memory 68 (equivalent to memories 36, 40, 41, 43, 45), such as random access memory (RAM) or other dynamic memory, for storing information and instructions to be executed by processor 64. Main memory 68 also may be used for storing temporary variables or other intermediate information during execution of instructions to be executed by processor 64. Computing system 60 may likewise include a read only memory (ROM) or other static storage device coupled to bus 62 for storing static information and instructions for processor 64.

Computing system 60 may also include information storage system 70, which may include, for example, a media drive 72 and a removable storage interface 80. The media drive 72 may include a drive or other mechanism to support fixed or removable storage media, such as flash memory, a hard disk drive, a floppy disk drive, a magnetic tape drive, an optical disk drive, a compact disk (CD) or digital versatile disk (DVD) drive (R or RW), or other removable or fixed media drive. Storage media 78 may include, for example, a hard disk, floppy disk, magnetic tape, optical disk, CD or DVD, or other fixed or removable medium that is read by and written to by media drive 72. As these examples illustrate, the storage media 78 may include a computer-readable storage medium having stored therein particular computer software or data.

In alternative embodiments, information storage system 70 may include other similar components for allowing computer programs or other instructions or data to be loaded into computing system 60. Such components may include, for example, a removable storage unit 82 and an interface 80, such as a program cartridge and cartridge interface, a removable memory (for example, a flash memory or other removable memory module) and memory slot, and other removable storage units 82 and interfaces 80 that allow software and data to be transferred from the removable storage unit 78 to computing system 60.

Computing system 60 can also include a communications interface 84 (equivalent to port 32 in FIG. 2). Communications interface 84 can be used to allow software and data to be transferred between computing system 60 and external devices. Examples of communications interface 84 can include a modem, a network interface (such as an Ethernet or other network interface card (NIC)), a communications port (such as for example, a USB port), a PCMCIA slot and card, etc. Software and data transferred via communications interface 84 are in the form of signals which can be electronic, electromagnetic, optical or other signals capable of being received by communications interface 84. These signals are provided to communications interface 84 via a channel 88. This channel 88 may carry signals and may be implemented using a wireless medium, wire or cable, fiber optics, or other communications medium. Some examples of a channel include a phone line, a cellular phone link, an RF link, a network interface, a local or wide area network, and other communications channels.

In this disclosure, the terms "computer program product," "computer-readable medium" and the like may be used generally to refer to media such as, for example, memory 68, storage device 78, or storage unit 82. These and other forms of computer-readable media may store one or more instructions for use by processor 64, to cause the processor to perform specified operations. Such instructions, generally referred to as "computer program code" (which may be grouped in the form of computer programs or other groupings), when executed, enable the computing system 60 to perform functions of embodiments of the invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 60 using, for example, removable storage drive 74, drive 72 or communications interface 84. The control logic (in this example, software instructions or computer program code), when executed by the processor 64, causes the processor 64 to perform the functions of embodiments of the invention as described herein.

This disclosure is illustrative and not limiting. Further modifications and improvements will be apparent to these skilled in the art in light of this disclosure and are intended to fall within the scope of the appended claims.

We claim:

1. A method for hashing a message, the method comprising:

using the message to initialize a table representing a deck of cards, each entry of a plurality of entries in the table initialized based on a portion of the message and representing a notional card in a set of cards within the deck of cards;

selecting a type of card shuffle from a plurality of different types of card shuffle to apply to the table;

modeling an interaction of the set of notional cards according to the selected type of card shuffle and computing a new order for the entries of the table based on the modeling;

updating the table to reflect the new order for the entries; and using the updated table to provide a non-keyed hash value of the message.

2. The method of claim 1, wherein the type of card shuffle determines an order of the notional cards within the deck of cards.

3. The method of claim 2, wherein each type card shuffle uses a pseudo random number function, and the selecting the type of card shuffle also uses the pseudo random number function.

4. The method of claim 1, wherein modeling the interaction of the set of notional cards comprises modeling the interaction of the cards of a physical game.

5. The method of claim 2, further comprising selecting a plurality of different types of card shuffles to apply to the table, wherein the plurality of types of card shuffles are applied to the table sequentially.

6. The method of claim 1, further comprising:
receiving a hash value associated with the message;
comparing the received hash value to the non-keyed hash value; and
authenticating the message if the comparison indicates a match.

7. The method of claim 1, wherein the message is one of a digital signature, a digital document, a digital message, a secret key or an identifier.

8. The method of claim 1, further comprising:
providing a security parameter; and
repeating the method a number of times equal to the security parameter.

9. The method of claim 1, wherein each entry in the table is one bit of data, one byte of data, one 16-bit word, one 32-bit word, or one 128-bit word.

10. The method of claim 1, wherein a size of the entries is modified during the modeling of the interaction of the set of notional cards.

11. The method of claim 3 further comprising seeding the pseudo random number function with the table entries to generate pseudo random numbers.

12. The method of claim 8, wherein for each repetition a different type of card shuffle is used.

13. An apparatus for hashing a message, the apparatus comprising:
a set of processing units for executing sets of instructions;
a computer readable storage for storing a program which when executed by at least one of the processing units performs the hashing of the message, the program comprising sets of instructions for:
using the message to initialize a table representing a deck of cards, each entry of a plurality of entries in the table initialized based on a portion of the message and representing a notional card in a set of cards within the deck of cards;
selecting a type of card shuffle from a plurality of different types of card shuffles to apply to the table;
modeling an interaction of the set of notional cards according to the selected type of card shuffle and computing a new order for the entries of the table based on the modeling;
updating the table to reflect the new order for the Entries; and
using the updated table to provide a non-keyed hash value of the message.

14. The apparatus of claim 13, wherein the type of card shuffle determines an order of the notional cards within the deck of cards.

15. The apparatus of claim 14, wherein each type of card shuffle uses a pseudo random number function, and the selecting the type of card shuffle also uses the pseudo random number function.

16. The apparatus of claim 13, wherein modeling the interaction of the set of notional cards comprises modeling the interaction of the cards of a physical game.

17. The apparatus of claim 14, wherein the program further comprises a set of instructions for selecting a plurality of different types of card shuffles to apply to the table, wherein the plurality of types of card shuffles are applied to the table sequentially.

18. The apparatus of claim 13, wherein the program further comprises sets of instructions for:
receiving a hash value associated with the message;
comparing the received hash value to the non-keyed hash value; and
authenticating the message if the comparison indicates a match.

19. The apparatus of claim 13, wherein the message is one of a digital signature, a digital document, a digital message, a secret key or an identifier.

20. The apparatus of claim 13, wherein the program further comprises sets of instructions for:
providing a security parameter; and
repeating the selecting, modeling and updating a number of times equal to the security parameter.

21. The apparatus of claim 13, wherein each entry in the table is one bit of data, one byte of data, one 16-bit word, one 32-bit word, or one 128-bit word.

22. The apparatus of claim 13, wherein a size of the entries is modified during the modeling of the interaction of the set of notional cards.

23. The apparatus of claim 15, wherein the pseudo random number function is seeded with the table entries.

24. The apparatus of claim 20, wherein for each repetition a different type of card shuffle is used.

25. A non-transitory machine readable medium storing a program for hashing a message, the program for execution by at least one processing unit, the program comprising sets of instructions for:
using the message to initialize a table representing a deck of cards, each entry of a plurality of entries in the table initialized based on a portion of the message and representing a notional card in a set of cards within the deck of cards;
selecting a type of card shuffle from a plurality of different types of card shuffles to apply to the table;
modeling an interaction of the set of notional cards according to the selected type of card shuffle and computing a new order for the entries of the table based on the modeling;
updating the table to reflect the new order for the entries; and
using the updated table to provide a non-keyed hash value of the message.

26. The non-transitory machine readable medium of claim 25, wherein the set of instructions for modeling the interaction of the set of notional cards comprises a set of instructions for modeling the interaction of elements of a physical game.

27. The non-transitory machine readable medium of claim 25, wherein the program further comprises sets of instructions for:
receiving a hash value associated with the message;
comparing the received hash value to the non-keyed hash value; and
authenticating the message if the comparison indicates a match.

28. The non-transitory machine readable medium of claim 25, wherein the message is one of a digital signature, a digital document, a digital message, a secret key or an identifier.

29. The non-transitory machine readable medium of claim 25, wherein the program further comprises sets of instructions for:
providing a security parameter; and
repeating the selecting, modeling and updating a number of times equal to the security parameter.

30. The non-transitory machine readable medium of claim 25, wherein each entry in the table is one bit of data, one byte of data, one 16-bit word, one 32-bit word, or one 128-bit word.

31. The non-transitory machine readable medium of claim 25, wherein a size of the entries is altered during the modeling of the interaction of the set of notional cards.

32. The non-transitory machine readable medium of claim 25, wherein the program further comprises a set of instructions for seeding a pseudo random number function with the table entries to generate pseudo random numbers.

33. An apparatus for hashing a message, the apparatus comprising:
a set of processing units for executing sets of instructions;
a computer readable storage for storing a program which when executed by at least one of the processing units performs the hashing of the message, the program comprising sets of instructions for:
using the message to be hashed to initialize a table representing a deck of cards, each entry of a plurality of entries in the table initialized based on a portion of the message and representing a notional card in a set of cards within the deck of cards;
reordering the entries of the table based on a plurality of card shuffling techniques that each determine a different reordering algorithm to apply to the table; and
using the updated table to provide a non-keyed hash value of the message.

34. The apparatus of claim 33, wherein a card shuffling technique models interaction of elements of a physical game.

35. The apparatus of claim 33, wherein the program further comprises sets of instructions for:
receiving a hash value associated with the message;
comparing the received hash value to the non-keyed hash value; and
authenticating the message if the comparison indicates a match.

36. The apparatus of claim 33, wherein the message is one of a digital signature, a digital document, a digital message, a secret key or an identifier.

37. The apparatus of claim 33, wherein the program further comprises sets of instructions for:
providing a security parameter; and
repeating the reordering a number of times equal to the security parameter.

38. The apparatus of claim 33, wherein each entry in the table is one bit of data, one byte of data, one 16-bit word, one 32-bit word, or one 128-bit word.

39. The apparatus of claim 33, wherein a size of the entries is altered during execution of reordering.

40. The apparatus of claim 33, wherein the program further comprises a pseudo random number function which is seeded with the table entries.

* * * * *